United States Patent
Au et al.

(10) Patent No.: US 8,731,048 B2
(45) Date of Patent: May 20, 2014

(54) EFFICIENT TEMPORAL SEARCH RANGE CONTROL FOR VIDEO ENCODING PROCESSES

(75) Inventors: Oscar Chi Lim Au, Hong Kong (CN); Zhiqin Liang, Hong Kong (CN)

(73) Assignee: Tsai Sheng Group LLC, Wilmington, DE (US)

( * ) Notice: Subject to any disclaimer, the term of this patent is extended or adjusted under 35 U.S.C. 154(b) by 1226 days.

(21) Appl. No.: 12/192,182

(22) Filed: Aug. 15, 2008

(65) Prior Publication Data
US 2009/0046776 A1 Feb. 19, 2009

Related U.S. Application Data

(60) Provisional application No. 60/956,438, filed on Aug. 17, 2007.

(51) Int. Cl.
*H04N 7/50* (2006.01)

(52) U.S. Cl.
USPC .............. 375/240.01; 375/240.27; 348/14.15; 382/236; 710/56

(58) Field of Classification Search
None
See application file for complete search history.

(56) References Cited

U.S. PATENT DOCUMENTS

| 4,695,883 | A | * | 9/1987 | Chandler et al. | 375/240.01 |
| 5,761,423 | A | * | 6/1998 | Lee | 709/215 |
| 5,812,199 | A | * | 9/1998 | Lu et al. | 375/240.16 |
| 6,078,328 | A | * | 6/2000 | Schumann et al. | 345/418 |
| 7,471,724 | B2 | * | 12/2008 | Lee | 375/240.12 |
| 2004/0258154 | A1 | * | 12/2004 | Liu et al. | 375/240.16 |
| 2007/0086515 | A1 | * | 4/2007 | Kirkenko et al. | 375/240.1 |
| 2007/0274385 | A1 | * | 11/2007 | He | 375/240.12 |
| 2008/0008242 | A1 | * | 1/2008 | Lu et al. | 375/240.16 |

OTHER PUBLICATIONS

Sun et al., A Content-adaptive Fast Multiple Reference Frames Motion Estimation in H.264, May 2007, Circuits and Systems, pp. 3651-3654.*

Milo Schield, Statistical Literacy: Difficulties in Describing and Comparing Rates and Percentages, Nov. 2000, Augsburg College, pp. 1-6.*

Thomas Wiegand, G. J. Sullivan, G. Bjontegaard, and A. Luthra, "Overview of the h.264/avc video coding standard," IEEE Trans. Circuits Syst. Video Technol., vol. 13, pp. 560-576, Jul. 2003. http://ip.hhi.de/imagecom_G1/assets/pdfs/csvt_overview_0305.pdf.

Draft ITU-T recommendation and final draft international standard of joint video specification (ITU-T Rec. H.264/ISO/IEC 14 496-10 AVC), Joint Video Team (JVT) of ISO/IEC MPEG and ITU-T VCEG, May 2003, JVT-G050. http://ip.hhi.de/imagecom_G1/assets/pdfs/JVT-G050.pdf.

Y.-H. Hsiao, T.-H. Lee, and P.-C. Chang, "Short/long-term motion vector prediction in multi-frame video coding system," in Proc. ICIP'2004, pp. 1449-1452. http://vaplab.ee.ncu.edu.tw/english/pc-chang/pdf/c58.pdf.

(Continued)

*Primary Examiner* — Nicholas Sloms
(74) *Attorney, Agent, or Firm* — Amin, Turocy & Watson, LLP

(57) ABSTRACT

Gain Saturation (GS) for MRFME is where searching in more previous frames offers very limited or even no performance gain. Similarly, gain aggregation (GA) is where significant gain can be obtained by searching more frames. By dynamically determining, while encoding, if either condition applies, and changing the search range accordingly, complexity is reduced and speed can be increased.

28 Claims, 11 Drawing Sheets

(56) References Cited

OTHER PUBLICATIONS

A. Chang, O. C. Au, and Y. Yeung, "A novel approach to fast multi-frame selection for h.264 video coding," in Proc. ICASSP'2003, pp. 413-416. http://www.mirlab.org/conference_papers/International_Conference/ICME%202003/pdfs/0100105.pdf.

C.-W. Ting, L.-M. Po, and C.-H. Cheung, "Center-biased frame selection algorithm for fast multi-frame motion estimation in h.264," in Proc. ICNNSP'2003, pp. 1258-1261.

Y. Su and M.-T. Sun, "Fast multiple reference frame motion estimation for h.264/avc," IEEE Trans. Circuits Syst. Video Technol., vol. 16, pp. 447-452, Mar. 2005. http://video.ee.ntu.edu.tw/publication/paper/%5BC%5D%5B2003%5D%5BVCIP%5D%5BBing-Yu.Hsieh%5D%5B1%5D.PDF.

Y.-W. Huang, B.-Y. Hsieh, T.-C. Wang, S.-Y. Chien, S.-Y. Ma, C.-F. Shen, and L.-G. Chen, "Analysis and Reduction of Reference Frames for Motion Estimation in MPEG-4 AVUJVTm.264," in Proc. ICASSP'2003, Apr. 6-10, 2003 Hong Kong.

C. Kim and C. C. J. Kuo, "Efficient temporal search range prediction for fast motion estimation in h.264," in IEEE International Workshop on Multimedia Signal Processing, Oct. 2005. http://viola.usc.edu/Publication/PDF%5C2005nonSPIEConfPaper/Paper10.pdf.

T. Wiegand, X. Zhang, and B. Girod, "Long-term memory motion compensated prediction," IEEE Trans. Circuits Syst. Video Technol., vol. 9, pp. 70-84, Feb. 1999.

G. Bjontegaard, Calculation of average PSNR differences between RDcurves, Joint Video Team (JVT), Apr. 2001, VCEG-M33.

"H.264/AVC Reference Software JM10.2," Jan. 2006. [Online]. Available: http://iphome.hhi.de/suehring/tml/.

X. Yang, W. Lin, Z. Lu X. Lin, S. Rahardja, E. Ong and S. Yao, "Rate control for Videophone Using Local Perceptual Cues", IEEE Trans. Circuit Syst. Video Tech., vol. 15, pp. 496-507, 2005.

H. J. Lee and T. H. Chiang and Y. Q. Zhang, "Scalable Rate control for MPEG-4 Video", IEEE Trans. Circuit Syst. Video Technol., vol. 10, pp. 878-894, 2000).

F. Moscheni, F. Dufaux and H. Nicholas, "Entropy criterion for optimal bit allocation between motion and prediction error information", Proc. SPIE Visual Commun. and Image Proc., pp. 235-242, Nov. 1993 http://www.google.com/url?sa=t&rct=j&q=&esrc=s&source=web&cd=2&ved=0CFMQFjAB&url=http%3A%2F%2Fciteseerx.ist.psu.edu%2Fviewdoc%2Fdownload%3Fdoi%3D10.1.1.52.3368%26rep%3Drep1%26type%3Dpdf&ei=z3oSUK3xLlyl8QT7_4HYCA&usg=AFQjCNF1wj97P_1cX4fLUr_TbeLxX7Adlw.

Zhiqin Liang, Jiantao Zhou, Oscar C. Au and Liwei Guo, "Content-adaptive Temporal Search Range Control Based on Frame Buffer Utilization", Hong Kong, China, 4 pages. (255_20070731).

* cited by examiner

EFFICIENT TEMPORAL SEARCH RANGE CONTROL FOR VIDEO ENCODING PROCESSES

CROSS-REFERENCE TO RELATED APPLICATIONS

This application claims priority to U.S. Provisional Application Ser. No. 60/956,438, filed on Aug. 17, 2007, entitled "EFFICIENT TEMPORAL SEARCH RANGE CONTROL FOR VIDEO COMPRESSION PROCESSES", the entirety of which is incorporated herein by reference.

TECHNICAL FIELD

The subject disclosure relates to temporal search range control optimizations for video encoding processes that efficiently process video data according to an adaptive processing model.

BACKGROUND

H.264 is a commonly used and widely adopted international video coding or compression standard, also known as Advanced Video Coding (AVC) or Moving Pictures Experts Group (MPEG)-4, Part 10. H.264/AVC significantly improves compression efficiency compared to previous standards, such as H.263+ and MPEG-4. To achieve such a high coding efficiency, H.264 is equipped with a set of tools that enhance prediction of content at the cost of additional computational complexity. In H.264, macro-blocks are used where macro-block (MB) is a term used in video compression, which represents a block of 16 by 16 pixels, though it is noted that different sized N×N blocks could be used as macro-blocks. In the YUV color space model, each macroblock contains 4 8×8 luminance sub-blocks (or Y blocks), 1 U block, and 1 V block (4:2:0, wherein the U and V provide color information). In addition to representation as YUV values, color data can be represented by 4:2:2 or 4:4:4 YCbCr format (Cb and Cr are the blue and red Chrominance components).

Most video systems, such as H.261/3/4 and MPEG-1/2/4, exploit spatial, temporal, and statistical redundancies in the source video. Some macro-blocks belong to more advanced macro-block types, such as skipped and non-skipped macro-blocks. In non-skipped macro-blocks, the encoder determines whether each of 8×8 luminance sub-blocks and 4×4 chrominance sub-blocks of a macro-block is to be encoded, giving the different number of encoded sub-blocks at each macro-block encoding time. It has been found that the correlation of bits between consecutive frames is high. Since the level of redundancy changes from frame to frame, the number of bits per frame is variable, even if the same quantization parameters are used for all frames.

A buffer has been employed to smooth out the variable video output rate and provide a constant video output rate. Rate control has been used to prevent the buffer from overflowing (resulting in frame skipping) and/or under-flowing (resulting in low channel utilization) in order to achieve acceptable video quality. Motion estimation/motion compensation (ME/MC) plays an important role in most of the video compression standards by efficiently reducing temporal redundancy. One important factor leading to enhancement of coding efficiency in H.264/MPEG4 AVC is the adoption of multiple reference frame motion estimation (MRFME). With MRFME, the encoder is allowed to extend the temporal search range to several previous frames stored in the buffer, hence, a better prediction results. However, the coding gain is achieved at the expense of high complexity, which linearly increases with the number of the reference frames. This restricts its applicability, especially for real-time applications.

Conventional systems for performing MRFME are mainly focused on reducing the complexity for a fixed temporal search range. One conventional way is to decrease the searching points by refining the search pattern or reference frame selection. An algorithm has been proposed to find a precise initial search point from the neighboring and temporal collocated blocks. A scheme to select a portion of the whole reference frames based on sub-sample location and center-biased property has also been suggested. However, any increase in speed with such algorithms has been insignificant. Another algorithm has been proposed based on motion vector concatenation that makes use of motion vector correlation among different reference frames.

Another conventional way for performing MRFME focuses on early termination decision. For example, statistical models have been built to decide whether it is necessary to perform a search on additional frames for each macro-block. The performance gain for MRFME depends highly on the video characteristics in the sense that for some video sequences with certain characteristics, the performance gain can be significant, while for other video sequences with other characteristics, the performance gain can be negligible. Therefore, since computational power for searching is sometimes wasted without any significant benefit, applying a fixed temporal search range is inefficient.

The above-described deficiencies of current designs for H.264/AVC-assisted encoding or compression are merely intended to provide an overview of some of the problems of today's designs, and are not intended to be exhaustive. Other problems with the state of the art and corresponding benefits of the innovation may become further apparent upon review of the following description of various non-limiting embodiments of the innovation.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to various exemplary non-limiting embodiments in a simplified form as a prelude to the more detailed description that follows.

Video data processing optimizations are provided for video encoding or compression processes that efficiently encode data. The optimizations take into account a relationship between reference frame buffer utilization and an optimal search range. The optimizations for encoding video data include receiving reference frame(s) of a sequence of image frames and adaptively changing a search range for searching reference frame(s). In various non-limiting embodiments, a host system including frames of video data to be encoded performs some encoding for the plurality of frames and then transmits a reference frame and P-frames including macro-blocks to a graphics subsystem for further encoding. The host system performs the encoding process for the macro-blocks while adaptively varying a search range used to encode the macro-blocks.

BRIEF DESCRIPTION OF THE DRAWINGS

The temporal search range control optimizations for video encoding processes are further described with reference to the accompanying drawings in which.

DETAILED DESCRIPTION

Overview

As discussed in the background, a fixed temporal search range is inefficient since sometimes computational power for searching is wasted without any corresponding benefit. Heretofore, there has been no attempt to adaptively set the temporal search range.

Accordingly, to address the wasted searching of conventional techniques, a content-adaptive algorithm is presented to control the temporal search range on the fly (real time) by monitoring the reference frame buffer utilization (RFBU). Regardless of the accuracy of the underlying ME method applied, various embodiments described below the RFBU is a measure of how many pixels in the reference frames are actively involved in generating the prediction, thus, a reflection of the overall efficiency of MRFME.

Gain Saturation (GS) for MRFME is where searching in previous frames offers very limited, insignificant, or even no performance gain. Similarly, gain aggregation (GA) can achieve a significant gain by searching more frames. By dynamically determining if either condition applies while encoding, and changing the search range accordingly, in various embodiments described herein, complexity is reduced with a concomitant increase in speed. By controlling the temporal search range, significant computational power is saved. As a result, in one non limiting embodiment, simpler and less expensive circuitry can be realized.

In a generalized non-limiting embodiment, a method for encoding video data including a sequence of image frames in a computing system can be provided. The method includes receiving at least one reference frame of the sequence of image frames and adaptively changing a search range for searching reference frame(s). In another non-limiting embodiment, a video compression system for compressing video in a computing system includes at least one data store for storing a plurality of frames of video data and a host system that processes at least part of an encoding process for the plurality of frames and transmits to a graphics subsystem a reference frame of the plurality of frames and a plurality of P-frames that include a plurality of macro-blocks, wherein the host system performs the encoding process for the macro-blocks while adaptively varying a search range used to encode the macro-blocks.

Figure 1:
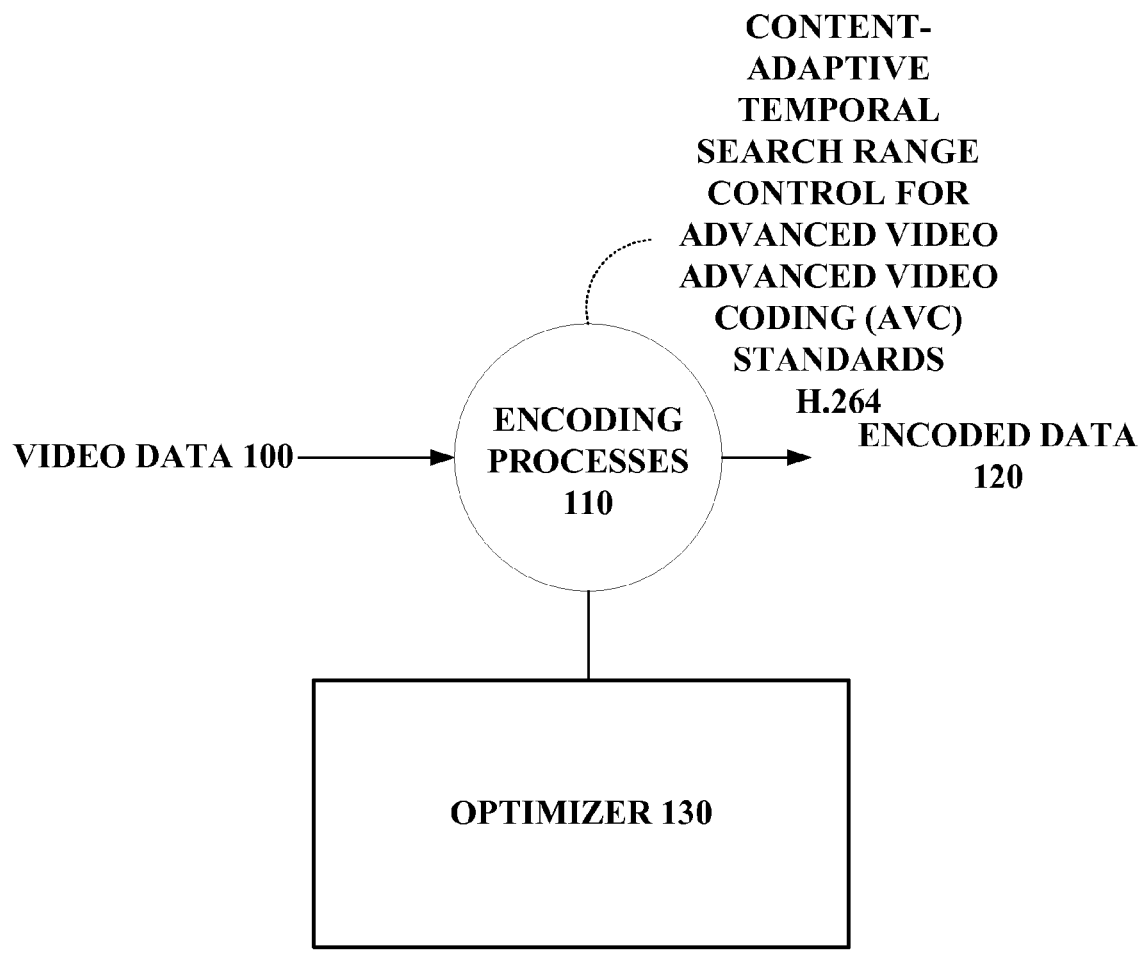
FIG. 1 illustrates exemplary, non-limiting encoding processes performed in accordance with the temporal search range control optimizations for video encoding processes.

The temporal search range can be adaptively set for each frame or can be adaptively set every N frames where N is an integer greater than 1. For example, the temporal search range can be adaptively set every three frames. As shown in FIG. 1, at a high level, video encoding includes receiving video data 100, encoding the video data 100 according to a set of encoding rules implemented by a set of encoding processes 110 that enable a corresponding decoder (not shown in FIG. 1) to decode the encoded data 120 that results from encoding processes 110. Encoding processes 110 typically compress video data 100 such that representation 120 is more compact than representation 100. Encodings can introduce loss of resolution of the data while others are lossless allowing video data 100 to be restored to an identical copy of video data 100. An optimizer component 130 can adaptively optimize the setting of the temporal search range. For example, in one embodiment, the optimizer component 130 adaptively changes the N based at least partially on a sensed event, a determined condition, and/or a prediction.

Figure 2:
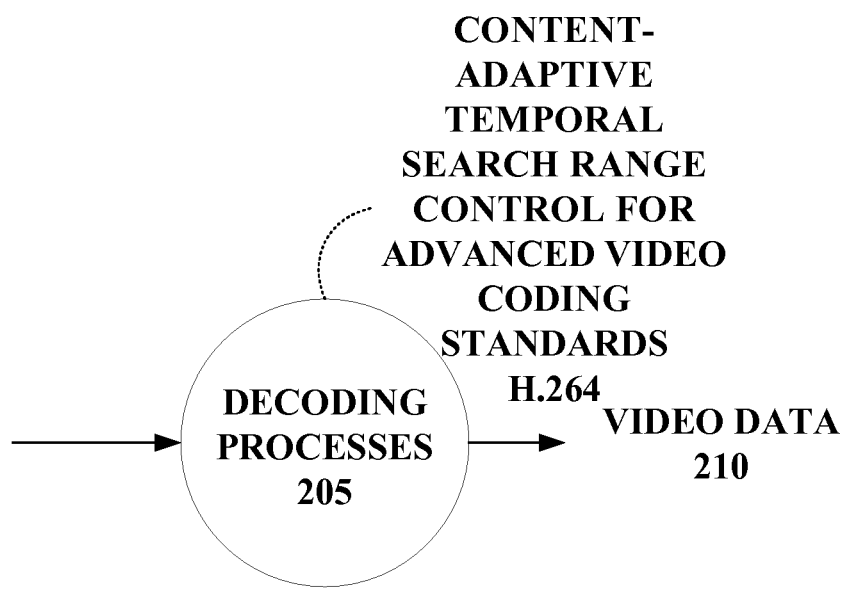
FIG. 2 illustrates exemplary, non-limiting decoding processes performed in accordance with the temporal search range control optimizations for video encoding processes.

As mentioned, an example of an encoding format is H.264/AVC. To encode data in H.264/AVC format, as illustrated in FIG. 1, video data 100 is processed by encoding processes 110 that implement H.264/AVC encoding processes, which results in encoded data 120 encoded according to the H.264/AVC format. A corresponding example of a decoding format is also H.264/AVC. To decode data in H.264/AVC format, as shown by FIG. 2, encoded video data 120 is processed by decoding processes 205 that implement H.264/AVC decoding processes, which results in video data 210 that is displayed to a user or users, stored, or otherwise further processed. The video data may have sustained some loss due to the compression.

As mentioned above, optimized encoding parameters are desirable. Accordingly, to address these deficiencies, as generally illustrated in the block diagram of FIG. 1, at least one generalized non-limiting embodiment performs efficient real-time temporal search range control for advanced video standards, such as H.264/AVC. As a result of using the optimal encoding processes, the complexity of an H.264/AVC encoding environment is reduced.

Figure 3:
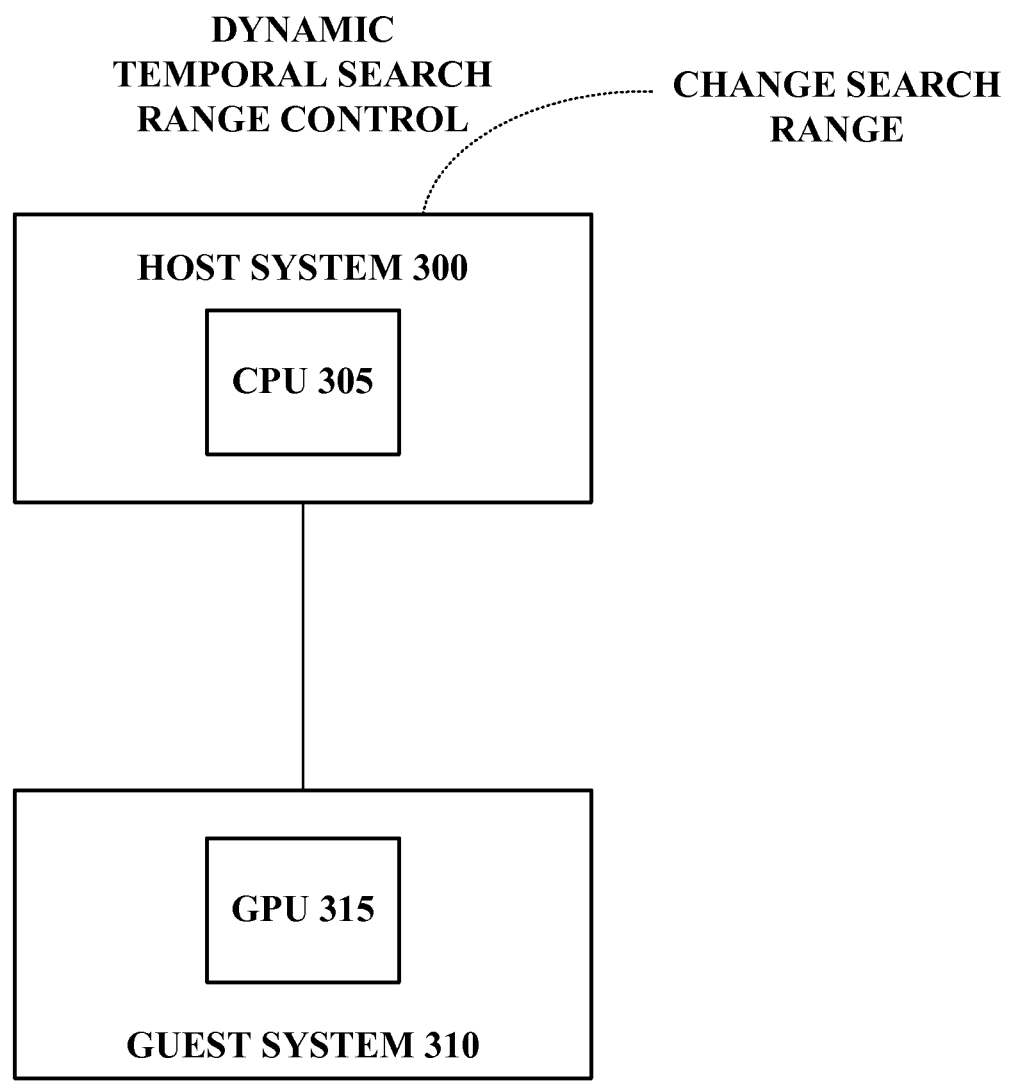
FIG. 3 is a flow diagram illustrating exemplary flow of data between a host and graphics subsystem in accordance with the temporal search range control optimizations for video encoding processes.

FIG. 3 is a block diagram illustrating an exemplary, non-limiting processing model for dynamic quality adjustment for performing the optimized encoding in accordance with at least one generalized non-limiting embodiment. A host system 300 performs the encoding processing on a host processor, such as CPU 305 of host system 300. Many computers include a graphics card and the data can be sent to the graphics card. Also, the host computer 300 can be connected to a guest system 310 with a guest processing unit (GPU) 315. Guest system 310, for instance, can be a graphics card or a computer, or other computer subsystem. With some video compression techniques, the first frame is intra-coded (I-frame) and subsequent frames are encoded as P-frames. P-frames are 'predicted' from the corresponding previous decoded frames using motion compensation and the residue can be obtained. These encoded frames are then transmitted to guest system 310. Some exemplary non-limiting aspects of non-limiting embodiments for optimal encoding processes for an H.264/AVC encoding environment are explained in greater detail below.

As a roadmap for what follows, a brief overview of encoding follows next. MRFME gains are discussed and the gains are related to the RFBU index. Details of an embodiment of a non limiting general algorithm are then presented. Scene change and temporal search range control for occurrences of scene change are also described. Next, some performance results of the adaptive search range techniques described herein are shown. Finally, some exemplary non-limiting computing environments in which one or more aspects of the embodiments described herein may be implemented are discussed.

Encoding

In H.264, frames are divided into N macro-blocks of 16×16 luminance samples each, with two corresponding 8×8 chrominance samples. In Quarter Common Intermediate Format (QCIF) picture format, there are 99 macro-blocks for each frame. As the name including 'quarter' implies, QCIF is a format used mainly in desk top and videophone applications, and has one fourth (a quarter) of the area of the Common Intermediate Format (CIF). The CIF is used to standardize horizontal and vertical resolutions in pixels of YCbCr sequences in video signals. CIF was designed to be easy to convert to phase alternation line (PAL) or National Television System Committee (NTSC) standards. CIF was first proposed in the H.261 standard. CIF defines a video sequence with a resolution of 352×288, a frame rate of 30000/1001 (roughly 29.97) fps, with color encoded using YCbCr 4:2:0. A number of consecutive macro-blocks in raster-scan order can be grouped into slices, representing independent coding units to be decoded without referencing other slices of the same frame.

Given that the whole frame is adopted as a unit slice, the frame header is encoded and N macro-blocks are processed one by one. The resulting macro-block syntax is macro-block header followed by macro-block residue data. In a P-frame, the macroblock header includes run-length, macro-block mode, motion vector data, coded block pattern (CBP) and a change of quantization parameter. When the macro-block header starts to be encoded, the run-length indicates the number of skipped macro-blocks that are made by copying the co-located picture information from the last decoded frame. In other words, the first frame is intra-coded (I-frame) with and subsequent frames are encoded as P-frames. This means that they are predicted from the corresponding previous decoded frames using motion compensation and the residue is obtained.

As mentioned, the adoption of MRFME can enhance the coding efficiency of H.264/MPEG4 AVC. In various non-limiting embodiments described herein, the encoder is allowed to extend the temporal search range to several previous frames stored in the buffer, hence resulting in a better prediction.

MRFME Gains

MRFME is believed to achieve better coding results because a better reference macro-block is expected to be obtained by extending the search to more reference frames, sometimes termed "repetition". Repetition, in general, includes meaningful repetitions such as repetitive motions, and meaningless repetitions due to lighting changes, camera noise, or sampling. In this regard, a major advantage of the herein described methods, apparatus, algorithms etc. arises from meaningless repetitions. Statistical models can be built to decide whether it is necessary to perform search on additional frames for each macro-block.

The performance gain for MRFME highly depends on the video characteristics in the sense that for some sequences the performance gain is significant while for others the performance gain is negligible. Therefore, a fixed temporal search range is inefficient since sometimes computational power for searching is wasted without any or few attendant benefits.

While distinguishing where the exact coding gain comes from for every sequence, the trend that "the more frequently these repetitions occur, the more gain that can be realized by MRFME" can be exploited. In other words, the performance gain of MRFME can depend on how efficiently the reference frame buffer can generate the prediction signal.

Effect on Gains

The optimal motion vector (MV) in the rate-distortion sense is found by minimizing the following Lagrange cost function over all motion vector candidates, as represented by Eqn. (1).

$$J(\vec{mv}|Q_p,N_{ref})=D(s,\vec{cmv}Q_p,N_{ref})+\lambda_{motion}[R(\vec{mv}-\vec{mp}|N_{ref},Q_p)+R(N_{ref}|Q_p)] \quad (1)$$

where $\vec{mv}$ and $\vec{mp}$ are the MV and predicted MV, Qp and $\lambda_{motion}$ are the quantization parameter and the Lagrange multiplier, s and $\vec{cmv}$ represent the original video signal and the reconstructed video signal. $N_{ref}$ is the number of references such as, for example, in one embodiment, $N_{ref}$ is the number of reference frames.

In the rate-distortion sense, searching more reference frames decreases prediction distortion; at the same time, however, searching more reference frames increases the rate term in at least two ways. Firstly, the more candidate reference frames, the more bits are needed for indexing, and consequently, the more bits are sent as side information. Secondly, as motion vectors are less correlated in different reference frames, the motion vector prediction may not be as accurate as the case with a single reference frame. This trade-off is verified by the simulation results listed in Table I. It shows the additional coding gain for the first 50 frames of the CIF test sequences, by performing ME on two to five reference frames (compared with search range with one reference frame).

TABLE I

AVERAGE ADDITIONAL GAIN (IN AVERAGE DB FOR THE FIRST 50 CIF FRAMES OF Akiyo, Coastguard, Tempete AND mobile Sequences (QP = 40).

| Sequences | 2 Refs | 3 Refs | 4 Refs | 5 Refs |
|---|---|---|---|---|
| Akiyo | −0.105 | −0.052 | −0.115 | −0.138 |
| Coastguard | 0.030 | 0.017 | 0.029 | 0.030 |
| Tempete | 0.407 | 0.485 | 0.517 | 0.541 |
| Mobile | 0.367 | 0.506 | 0.589 | 0.640 |

It can be seen from Table I that a single reference frame search range provides the best performance for Akiyo. Searching in two reference frames performs as well as searching in five reference frames for coastguard. However, the results for tempete and mobile are significantly different demonstrating that a larger search range yields better coding performance. In order to discriminate the different scenarios, one can define a gain saturation (GS) effect for MRFME when searching in more previous frames offers very limited or even no performance gain. Similarly, one can define a gain aggregate (GA) effect when significant gains can be obtained by searching more frames. These two effects can be observed in FIG. 7 (GA) and FIG. 8 (GS).

A more formal definition of GS/GA state is given in table II, where $\theta_1$ and $\theta_1$ are two threshold values. In the following, for simplicity of statement, a particular temporal search range L for a sequence S in gain saturation state is denoted by ((LS) $\in$ GS). The GA state can be defined similarly as set forth in table II below.

TABLE II

DEFINITION OF GA AND GS STATE D(L, S) DENOTES DISTORTION BY SETTING SEARCH RANGE TO L FOR SEQUENCE S

| | |
|---|---|
| GS State | (L, S) $\in$ GS iff |
| | (D(L-1, S) − D(L, S)) < $\theta_1$ |
| GA State | (L, S) $\in$ GA iff |
| | (D(L, S) − D(L-1, S)) > $\theta_2$ |

When the temporal search range increases from unity to infinity, a gradual transition from GS to GA is observed. And the extra computational power due to the extension of search range is worthy in the GA state, while, merely wasteful in GS state.

When the effect of MRFME is saturated (GS), searching in more frames does not affect the optimal results (in the Rate-Distortion sense), which means that most of the macro-blocks reference to the recent frames. The worst case for l(t)=5 would be RFBUI=20%, when all the macro-blocks refer to the most recent frame. Therefore, when the MRFME is in GS state, the index would be low. Conversely, when MRFME is useful, in the GA status, many of the macro-blocks may reference to the other frames. The RFBUI value would be large. Thus, the index is approximates the percent of the useful pixels stored in the reference frame buffer, which are used by later frames to generate prediction signals.

The Reference Frame Buffer Utilization Index (RFBUI)

In order to quantitatively distinguish the cases of GA and GS, the concept of reference frame buffer utilization index (RFBUI) is introduced in this subsection. A video sequence is denoted as $\{F_0, F_1, \ldots F_n\}$ where $F_i$ is the ith frame with $N_b$ macro-blocks. $R^{i,j} \in \{0,1\}^{N_b}$ denotes the group of macro-blocks in $F_i$ that are referenced by $F_{i+j}$. Macro-blocks (MB) are indexed by their scanning order in the frame. The element $R_k^{i,j}$ equals one if $MB_k$ is in $\vec{R}^{i,j}$ and zero otherwise. $\|R^{i,j}\|$ represents the total number of ones in $\vec{R}^{i,j}$. Finally, $\vec{R}^{i,m} \cup \vec{R}^{i,n}$ is defined as $\{R_k^{i,m} \vee R_k^{i,n}, k \in [1, N_b]\}$ where $\vee$ is the bitwise OR operation. The RFBUI at time t is defined by Eqn. (2):

$$RFBUI(t) = \frac{\sum_{i=1}^{k} \left\| \bigcup_{j=0}^{i} \vec{R}^{t-k,t+j} \right\|}{l(t) \times N_b} \quad (2)$$

where k is the maximum search range and l(t) denotes the temporal search range of $F_t$.

A macro-block or a pixel is deemed "useful" when it is referenced by later frames. The nominator of the index is actually the total number of useful macro-blocks in the reference frame buffer. The denominator is the size of the buffer in MBs. Thus, the index approximates the percent of the useful pixels stored in the reference frame buffer that are used by later frames to generate a prediction signal.

Temporal Search Range Control

Since the video sequence characteristics change over time, a fixed temporal search range to the entire sequence is likely to be inefficient. The optimal value of temporal search range is thus one selected that does not result in the system in either the GA state or the GS state. As discussed above, the GS and GA states can be differentiated or approximated by the RFBUI. One exemplary algorithm to adjust the search range adaptively can be by monitoring the RFBUI using pseudo code as follows:

```
At time t, let t' = t Range_max;
if( RFBUI( t') < TH_gs (N_b, Q_p, l( t')))
    CurRange = max (Range_min, CurrentRange − 1);
else if (RFBUI( t') > TH_ga (N_b, Q_p, l(t)))
    CurRange = min(Range_max, CurrentRange + 1);
Else CurRange = CurRange;
```

This exemplary non-limiting pseudo code is an effective algorithm to control the temporal search range (CurRange). $Range_{max}$ and $Range_{min}$ represent the maximum and minimum search range allowed. The value of l(t) is the search range for $F_t$. The $TH_{gs}$ and $TH_{ga}$ are thresholds tables indexed by $N_b$, $Q_p$, and l(t).

The threshold values can be set based on training data obtained from testing standard sequences. For frame size $N_0$, for instance, a table obtained was generated from 100 training sequences. Each sequence were selected to contain 40 consecutive frames taken from various standard testing sequences, such as the first 40 frames of foreman. The sequences were encoded with quality factor $QP_0$ and fixed search range $R_0$. Then the frames were classified into three classes (GA, GS, and $\overline{GA} \cap \overline{GS}$) according to TABLE II by setting $\theta_1 = \theta_2 = 0.02$ and D(L, S) being the peak signal-to-noise ratio (PSNR). PSNR is an engineering term for the ratio between the maximum possible power of a signal and the power of corrupting noise that affects the fidelity of its representation. Because many signals have a very wide dynamic range, PSNR is usually expressed in terms of the logarithmic decibel. Typical values for the PSNR in image compression are between 30 and 40 dB for a given PSNR measure. In this regard, the average RFBUI for each sequence can be calculated, respectively. In non-limiting fashion, the threshold entry $TH_{gs}(N_0, QP_0, R_0)$ was set equal to the value $\theta_{gs}$ such that 80% of the sequences in GS have RFBUI value smaller than $\theta_{gs}$. Similarly, $TH_{ga}(N_0, QP_0, R_0)$ was set equal to a value $\theta_{ga}$ such that 80% of the sequences in GA have RFBUI value larger than $\theta_{ga}$.

Figure 4:
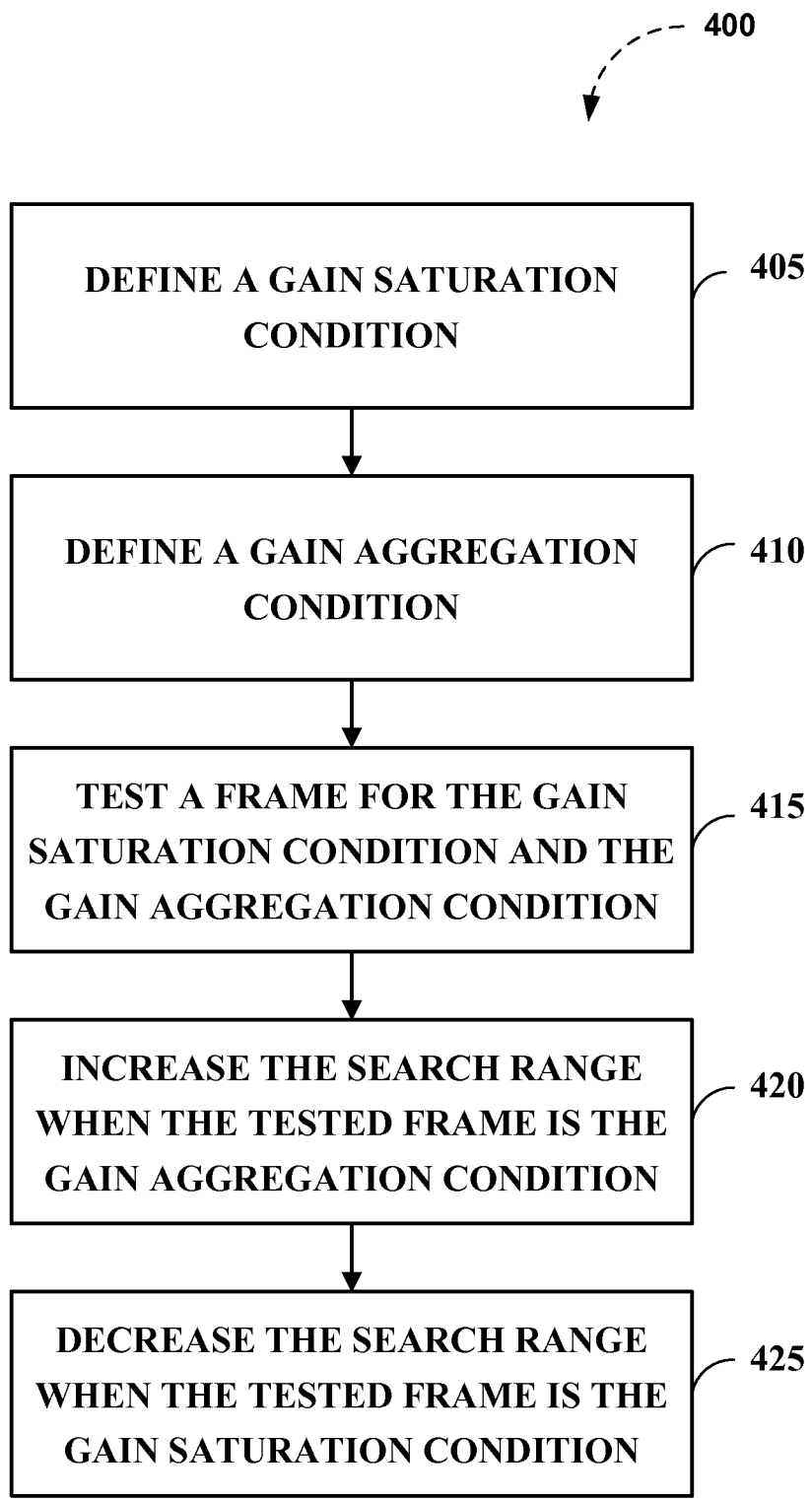
FIG. 4 is a flow diagram illustrating exemplary flow in accordance with the temporal search range control optimizations for video encoding processes.

FIG. 4 illustrates a flow diagram of a generalized process 400 for performing optimal encoding in accordance with one embodiment. The generalized process 400 includes defining a gain saturation condition (GS) at 405. At 410, a gain aggregation (GA) condition is defined. A frame is tested for the gain saturation condition and the gain aggregation condition at 415. The search range is increased when the frame is in the gain aggregation condition at 420. The search range is decreased when the frame is in the gain saturation condition at 425. Accordingly, real time search range control is achieved.

Figure 5:
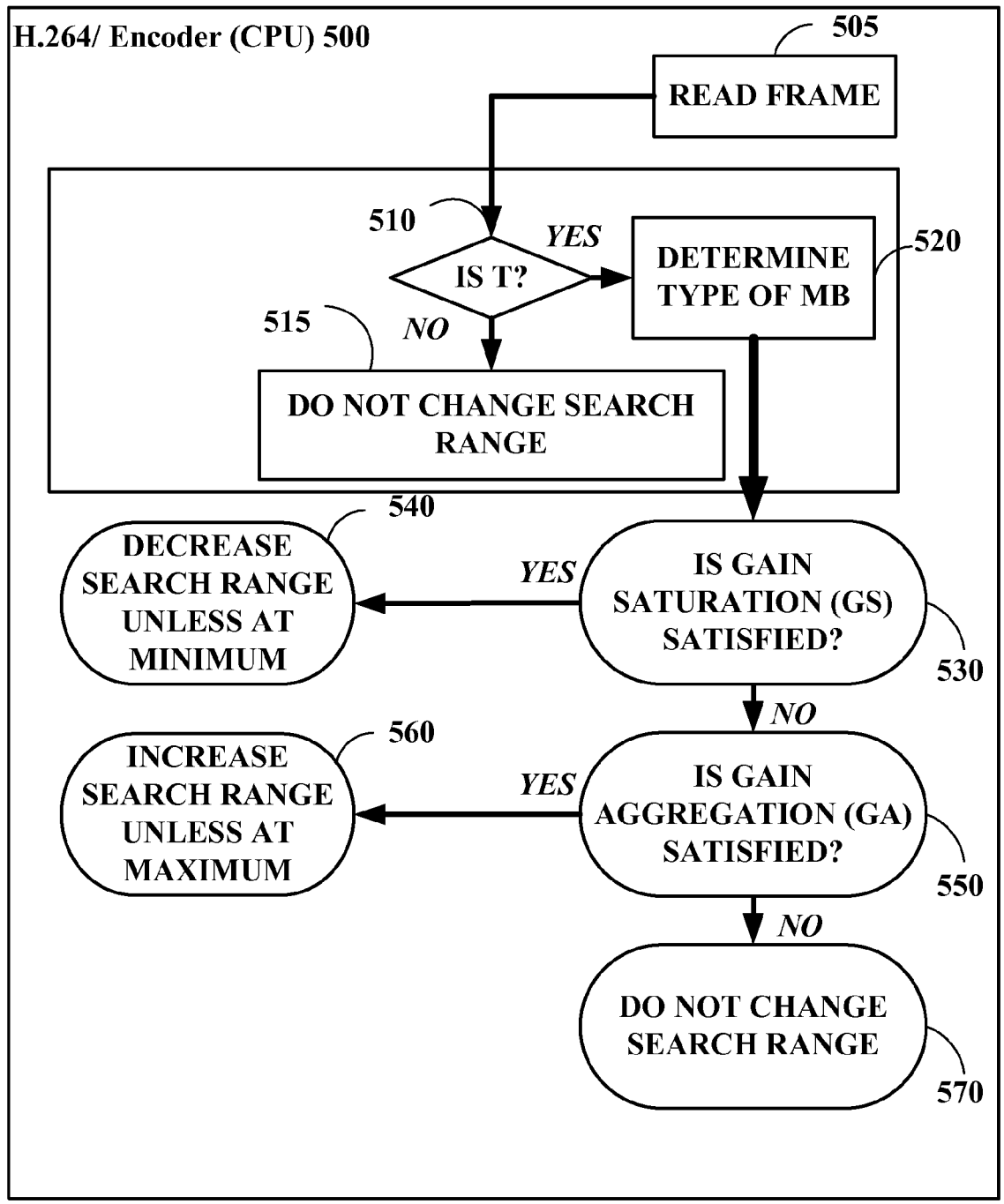
FIG. 5 is a flow diagram illustrating exemplary flow in accordance with optimizations for video encoding processes.

FIG. 5 illustrates the flow 500 an encoding CPU uses to encode macro-blocks. At 505, a frame is read. At 510, it is determined if it is time T, wherein T means it is time to alter the search range. In a different embodiment, instead if determining if it is time T, it is determined if the frame is an Nth frame. Alternatively, there is no determination and all P frames are examined. More specifically, if the frame is not going to be looked at, then, at 515, the search range is not changed. However, if it is time T or any other criteria that is used to determine that a search range change can be desirable, then the frame is examined to determine if the frame is in the GA or GS state.

Additionally, instead of a frame by frame analysis, one can employ a macro-block by macro-block analysis. More particularly, each individual macro-block can be examined at 520 to determine if the macro-block is in the GA or GS state. At 530, it is determined if the gain saturation condition is satisfied and if so then, at 540, the search range is decreased unless the range is already at the minimum value. The minimum value can be unity or any other desired value. If the gain saturation condition is not satisfied, then, at 550, it is determined if the gain aggregation condition is satisfied and, if so, then, at 560, the search range is increased unless the range is already at the maximum value. The maximum value can be 5 or any other desired value. If the frame or macro-block is not in either the gain saturation condition or the gain aggregation condition, then the frame or macro-block is encoded without changing the search range.

Figure 6:
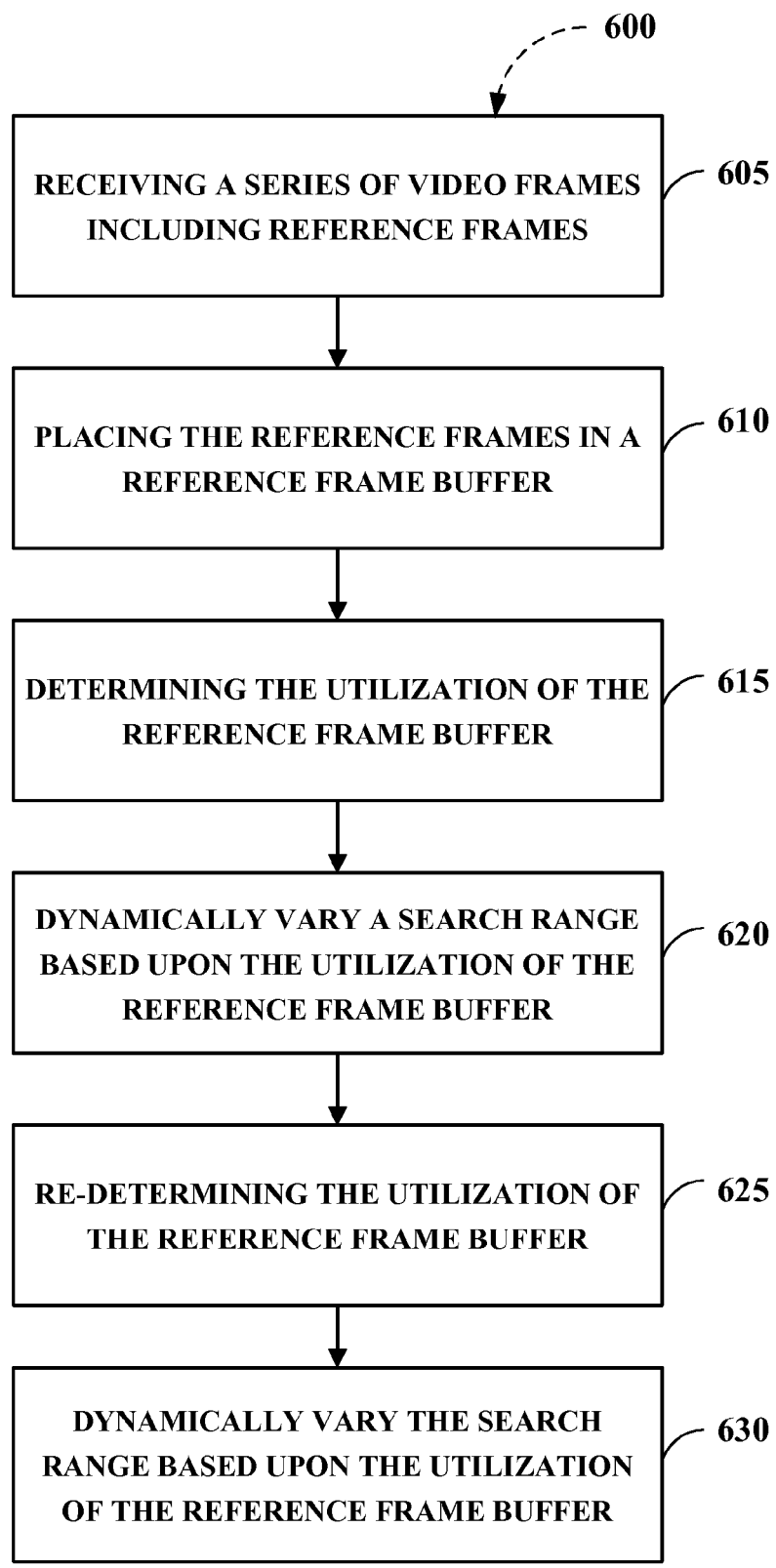
FIG. 6 is a flow diagram illustrating exemplary flow in accordance with optimizations for video encoding processes.

FIG. 6 illustrates a methodology 600 for dynamically changing the search range in real time to adapt to changing video content. At 605, a series of video frames including reference frames are received. The series also includes non-reference frames such as P frames. At 610, the reference frames are placed in a reference frame buffer. At 615, the utilization of the reference frame buffer is determined. The search range is dynamically varied based upon the utilization of the reference frame buffer at 620. At a later time, based on a timing signal (such as being at time T, every 5 seconds, every 1 second . . . ), a numbering scheme (every third frame, every fourth macro-block . . . ), or any other trigger to have occurred, such as a scene change being determined to have occurred or as described below an artificial intelligence component recommending a search range change, the utilization of the reference frame buffer is re-determined at 625.

In one non-limiting embodiment, an artificial intelligence (AI) component is employed. The AI component can be employed to facilitate inferring and/or determining when, where, how to dynamically vary the search range. Such inference results in the construction of new events or actions from a set of observed events and/or stored event data, whether or not the events are correlated in close temporal proximity, and whether the events and data come from one or several event(s) and data source(s).

The AI component can also employ any of a variety of suitable AI-based schemes in connection with facilitating various aspects of the herein described embodiments, and for assisting in determining characteristics of video for use in efficient encoding. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

At 630, the search range is dynamically varied based at least partially on the utilization of the reference frame buffer from the re-determination at 625. Although not explicitly shown in FIG. 6, the utilization of the reference frame buffer is re-determined repeatedly, and in one exemplary general embodiment, the utilization of reference frame buffer is checked every time a frame is received.

Figure 7:
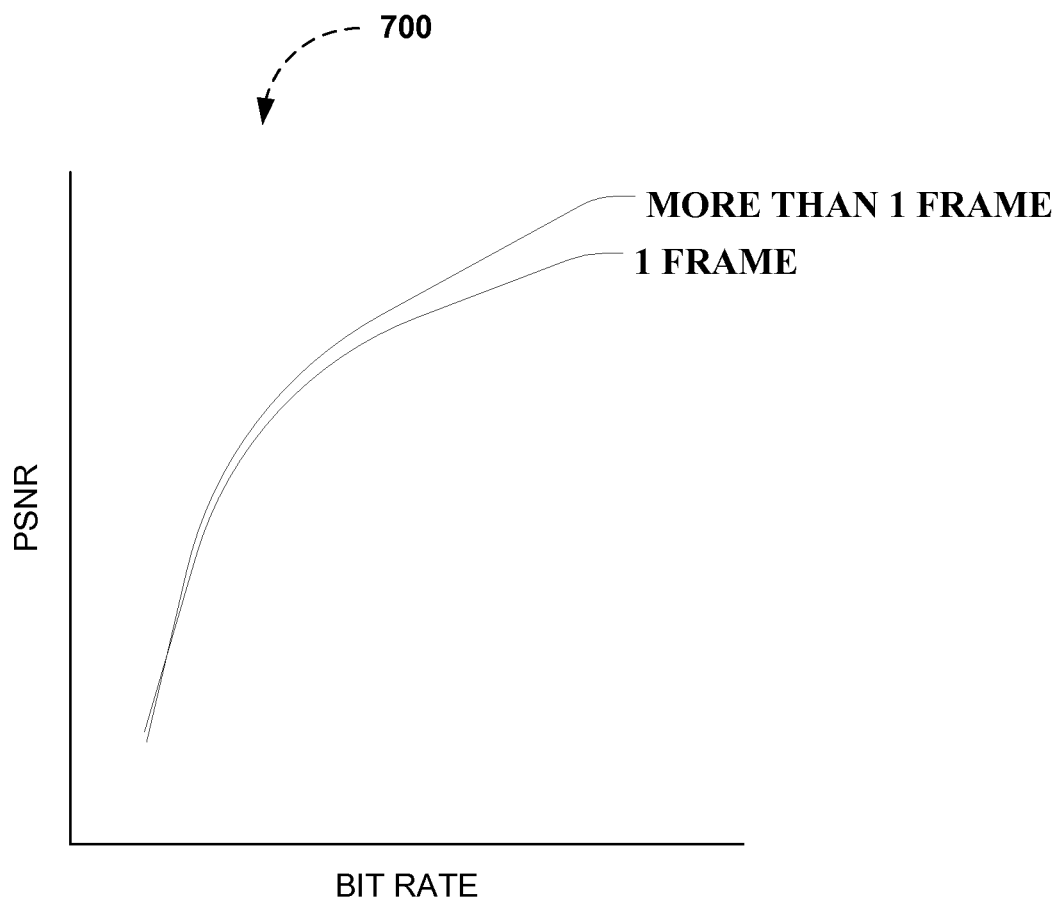
FIG. 7 illustrates a graph of the PSNR for a video sequence that was processed with unity as the search range and more than one frame as the search range in accordance with optimizations for video encoding processes.
Figure 8:
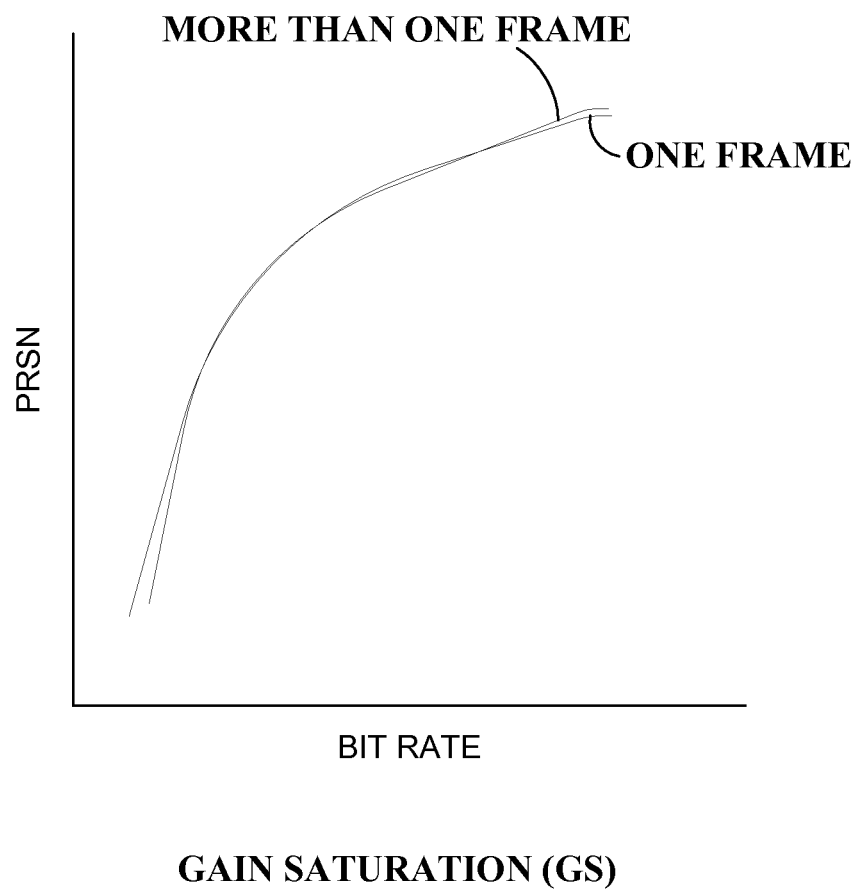
FIG. 8 illustrates a graph of the PSNR for a video sequence that was processed with unity as the search range and more than one frame as the search range.

FIG. 7 illustrates a graph of the PSNR for a video sequence that was processed with unity as the search range and more than one frame as the search range. As illustrated in FIG. 7, the more than 1 frame line is substantially higher than the 1 frame line illustrating a gain aggregation condition. In other words, the use of a higher search range affords substantial benefits. This can be contrasted with FIG. 8 that also illustrates a graph of the PSNR for a video sequence that was processed with unity as the search range and more than one frame as the search range. However, in FIG. 8 the more than 1 frame line is substantially equal to the 1 frame line illustrating a gain saturation condition. In other words, FIGS. 7 and 8 illustrate that sometimes the employ of more search frames has little or no benefit (FIG. 8) and other times substantial benefit (FIG. 7).

For example, it is believed that when a scene change occurs as described below, there is little or no benefit to having a high search range and it would be desirable to detect scene changes and set the range to unity when a scene change occurs.

Determination of Scene Change

Scene changes are likely to occur when the residue energy of the P-frame is relatively high. This usually occurs in relatively fast-motion video and any video with a sudden change in static background. In a Laplacian distribution x with probability function p(x), the residue energy $E_i$ of the i-th macro-block in the continuous case can be given by Eqn. (3):

$$E_i = \int_{-\infty}^{\infty} x^2 p(x) dx - \left( \int_{-\infty}^{\infty} x p(x) dx \right)^2 = \sigma_i^2 \quad (3)$$

One popular rate model $R_i$ of the i-th macro-block is given by Eqn. (4):

$$R_i = K \sigma_i^2 / Q_i^2 \quad (4)$$

where K, $\sigma_i$, and $Q_i$ are model parameter, standard deviation, and quantization step size of the i-th macro-block respectively.

By substituting Eq. (4) into Eq. (3), one obtains Eqn. (5):

$$E_i = R_i Q_i^2 / K \quad (5)$$

For simplicity, one can use Eqn. (6) for determination of scene change, since K is a constant term and can be ignored, if desired:

$$E'_i = R_i Q_i^2 \quad (6)$$

When the i-th macro-block is processed to be encoded, the accumulated residue energy E in the current frame is given by Eqn. (7):

$$E' = \sum_{j=1}^{i} R_j Q_j^2 \quad (7)$$

Scene change is determined when the following condition given by Eqn. (8) is held:

$$E' > B_t \overline{Q}_{prev}^2 \times iL/N \quad (8)$$

where $B_t$ is the target total bits of the current frame, $\overline{Q}_{prev}$ is the average QP of the previous frame, N is the total number of macro-blocks in the current frame and L is threshold factor for determination of scene change. In an empirical example, as a non-limiting detail, L was chosen to be 1.3. When the scene change happens, a high bit correlation coefficient may not remain, and the remaining macro-blocks of the current frame can be encoded with a search range of unity.

Figure 9:
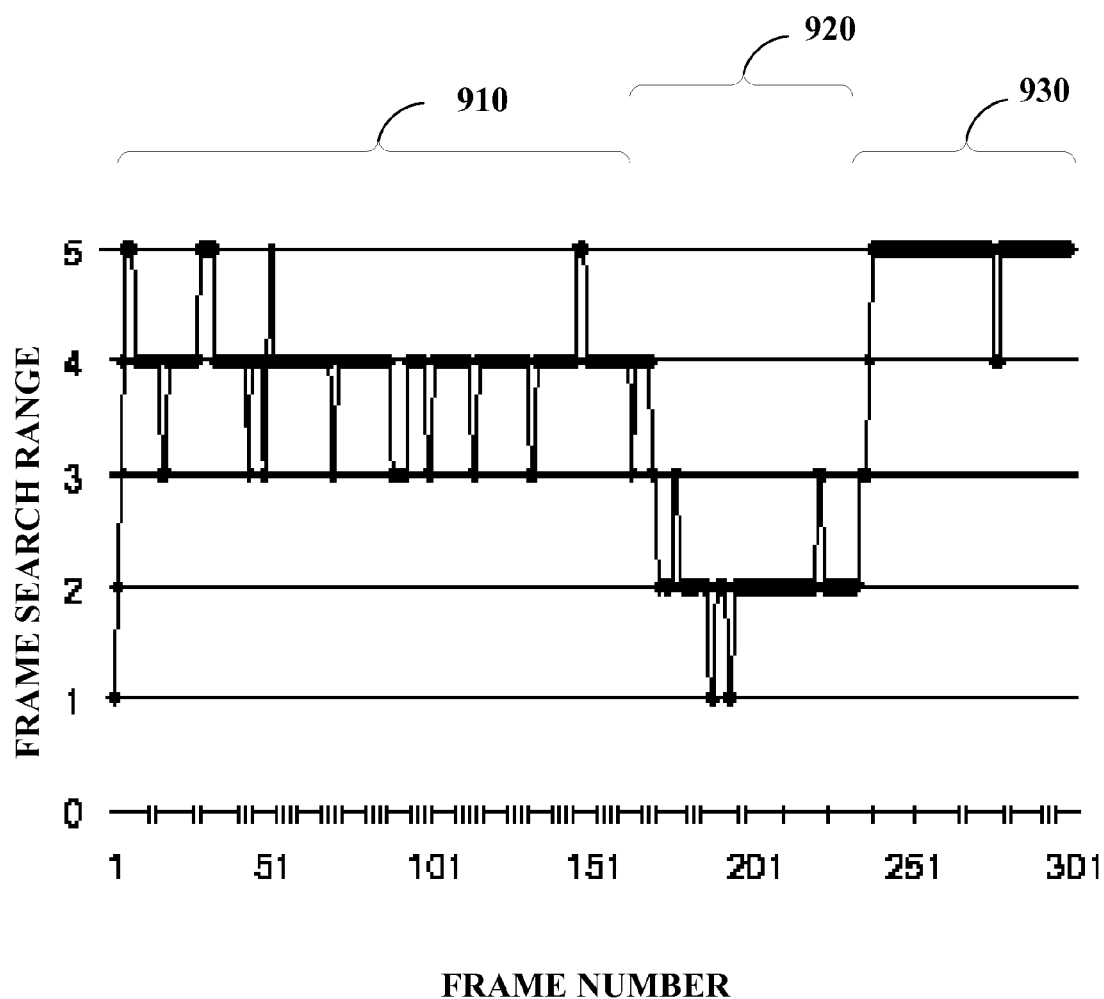
FIG. 9 illustrates the search range for all frames in a video.

FIG. 9 illustrates exemplary dynamic changing of the search range. More particularly FIG. 9 illustrates the Foreman sequence can be divided into three scenes: foreman talking (scene one 910), camera panning (scene two 920), and semi-stabilized focusing at the construction site (scene three 930). The herein described methods, apparatus, algorithms etc. can be integrated with any block-based fast MRFME algorithms. Because different fast MEs perform trade offs in coding gain and complexity differently, exact execution time is hard to pinpoint, however, computational complexity here can be approximated via measurement of the total number of frames searched instead.

TABLE III

|  | Complexity | PSNR (dB) | Bitrates (Kbps) |
|---|---|---|---|
| Paris CIF ($Q_t = 28$) | | | |
| Original (ref = 5) | 1500 | 35.540 | 458.56 |
| Proposed | 668 | 35.526 | 456.22 |
| Saved | 55.47% | −0.014 | 0.01% |
| Foreman CIF ($Q_t = 28$) | | | |
| Original (ref = 5) | 1500 | 36.380 | 399.52 |
| Proposed | 1118 | 36.365 | 399.81 |
| Saved | 25.47% | −0.015 | −0.07% |
| Football CIF ($Q_t = 28$) | | | |
| Original (ref = 5) | 1300 | 35.895 | 1346.76 |
| Proposed | 928 | 35.886 | 1341.21 |
| Saved | 28.62% | −0.008 | 0.41% |

Exemplary non-limiting algorithms, such as set forth in the pseudo code above, were tested on three CIF (352×288) sequences with different degrees of object and camera motion: Paris (300 frames), Foreman (300 frames), and Football (260 frames). The original method (comparison method) was to use a fixed temporal range of five in every sequence. Table III above summarizes the results of PSNR, bitrates and complexity of adaptively changing the search range versus employing a static value. Compared with the fixed search range scheme, the herein described embodiments can efficiently reduce the complexity by about 40% while having negligible performance penalty (about 0.01 dB and 0.2% bitrate).

The simulation results also reveals that the degree of motion activity in the scene is closely related to the possible additional coding gain achieved by extending the search range. The additional gain is peaked at certain medium degree of motion while the low motion scenes and the high motion scenes do not benefit much. This is because searching in 1 or 2 recent frames already produces an accurate prediction signal for the low degree case, while, a good match is unlikely to be found in any of the reference frames for the high motion case. Thus, controlling the temporal search range adaptively to video characteristics can be advantageous. FIG. 9 shows the number of reference frames searched for each frame for foreman. The result indicates that the herein described algorithm adapts to the video characteristics quite well.

Exemplary Computer Networks and Environments

One of ordinary skill in the art can appreciate that the innovation can be implemented in connection with any computer or other client or server device, which can be deployed as part of a computer network, or in a distributed computing environment, connected to any kind of data store. In this regard, the present innovation pertains to any computer system or environment having any number of memory or storage units, and any number of applications and processes occurring across any number of storage units or volumes, which may be used in connection with optimization algorithms and processes performed in accordance with the present innovation. The present innovation may apply to an environment with server computers and client computers deployed in a network environment or a distributed computing environment, having remote or local storage. The present innovation may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the optimization algorithms and processes of at least one generalized non-limiting embodiment.

Figure 10:
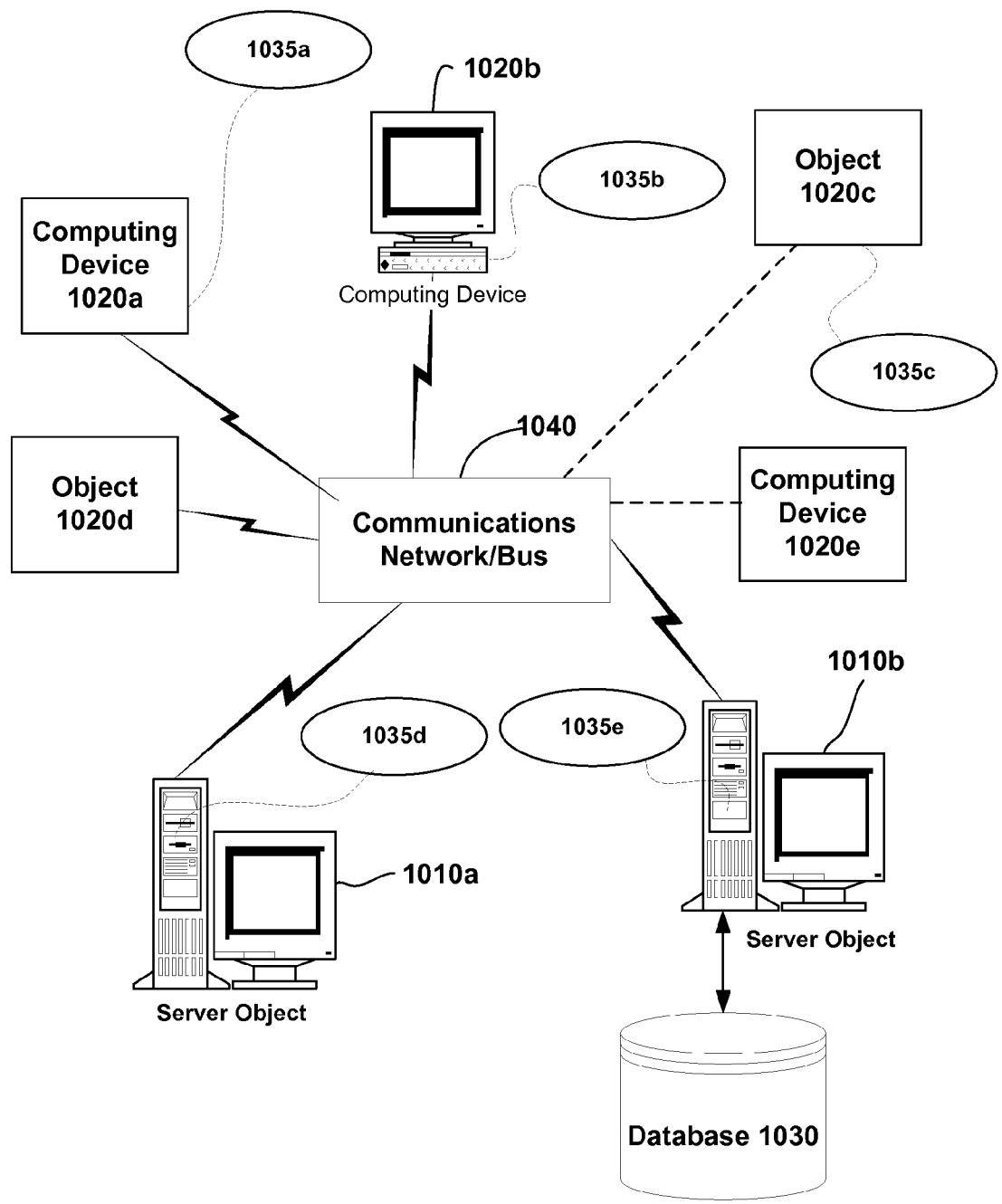
FIG. 10 is a block diagram representing an exemplary non-limiting computing system or operating environment in which the present innovation may be implemented.

FIG. 10 provides a schematic diagram of an exemplary networked or distributed computing environment. The distributed computing environment comprises computing objects 1010a, 1010b, etc. and computing objects or devices 1020a, 1020b, 1020c, 1020d, 1020e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1040. This network may itself comprise other computing objects and computing devices that provide services to the system of FIG. 10, and may itself represent multiple interconnected networks. In accordance with an aspect of at least one generalized non-limiting embodiment, each object 1010a, 1010b, etc. or 1020a, 1020b, 1020c, 1020d, 1020e, etc. may contain an application that might make use of an application programming interface (API), or other object, software, firmware and/or hardware, suitable for use with the design framework in accordance with at least one generalized non-limiting embodiment.

It can also be appreciated that an object, such as 1020c, may be hosted on another computing device 1010a, 1010b, etc. or 1020a, 1020b, 1020c, 1020d, 1020e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to optimization algorithms and processes according to the present innovation.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11A/B/G) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present innovation may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 10, as an example, computers 1020a, 1020b, 1020c, 1020d, 1020e, etc. can be thought of as clients and computers 1010a, 1010b, etc. can be thought of as servers where servers 1010a, 1010b, etc. maintain the data that is then replicated to client computers 1020a, 1020b, 1020c, 1020d, 1020e, etc., although any computer can be considered a client, a server, or both, depending on the circumstances. Any of these computing devices may be processing data or requesting services or tasks that may implicate the optimization algorithms and processes in accordance with at least one generalized non-limiting embodiment.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the optimization algorithms and processes of at least one generalized non-limiting embodiment may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 10 illustrates an exemplary networked or distributed environment, with server(s) in communication with client computer (s) via a network/bus, in which the present innovation may be employed. In more detail, a number of servers 1010a, 1010b, etc. are interconnected via a communications network/bus 1040, which may be a LAN, WAN, intranet, GSM network, the Internet, etc., with a number of client or remote computing devices 1020a, 1020b, 1020c, 1020d, 1020e, etc., such as a portable computer, handheld computer, thin client, networked appliance, or other device, such as a VCR, TV, oven, light, heater and the like in accordance with the present innovation. It is thus contemplated that the present innovation may apply to any computing device in connection with which it is desirable to communicate data over a network.

In a network environment in which the communications network/bus 1040 is the Internet, for example, the servers 1010a, 1010b, etc. can be Web servers with which the clients 1020a, 1020b, 1020c, 1020d, 1020e, etc. communicate via any of a number of known protocols such as HTTP. Servers 1010a, 1010b, etc. may also serve as clients 1020a, 1020b, 1020c, 1020d, 1020e, etc., as may be characteristic of a distributed computing environment.

As mentioned, communications may be wired or wireless, or a combination, where appropriate. Client devices 1020a, 1020b, 1020c, 1020d, 1020e, etc. may or may not communicate via communications network/bus 14, and may have independent communications associated therewith. For example, in the case of a TV or VCR, there may or may not be a networked aspect to the control thereof. Each client computer 1020a, 1020b, 1020c, 1020d, 1020e, etc. and server computer 1010a, 1010b, etc. may be equipped with various application program modules or objects 1035*a*, 1035*b*, 1035*c*, etc. and with connections or access to various types of storage elements or objects, across which files or data streams may be stored or to which portion(s) of files or data streams may be downloaded, transmitted or migrated. Any one or more of computers 1010*a*, 1010*b*, 1020*a*, 1020*b*, 1020*c*, 1020*d*, 1020*e*, etc. may be responsible for the maintenance and updating of a database 1030 or other storage element, such as a database or memory 1030 for storing data processed or saved according to at least one generalized non-limiting embodiment. Thus, the present innovation can be utilized in a computer network environment having client computers 1020*a*, 1020*b*, 1020*c*, 1020*d*, 1020*e*, etc. that can access and interact with a computer network/bus 1040 and server computers 1010*a*, 1010*b*, etc. that may interact with client computers 1020*a*, 1020*b*, 1020*c*, 1020*d*, 1020*e*, etc. and other like devices, and databases 1030.

Exemplary Computing Device

Figure 11:
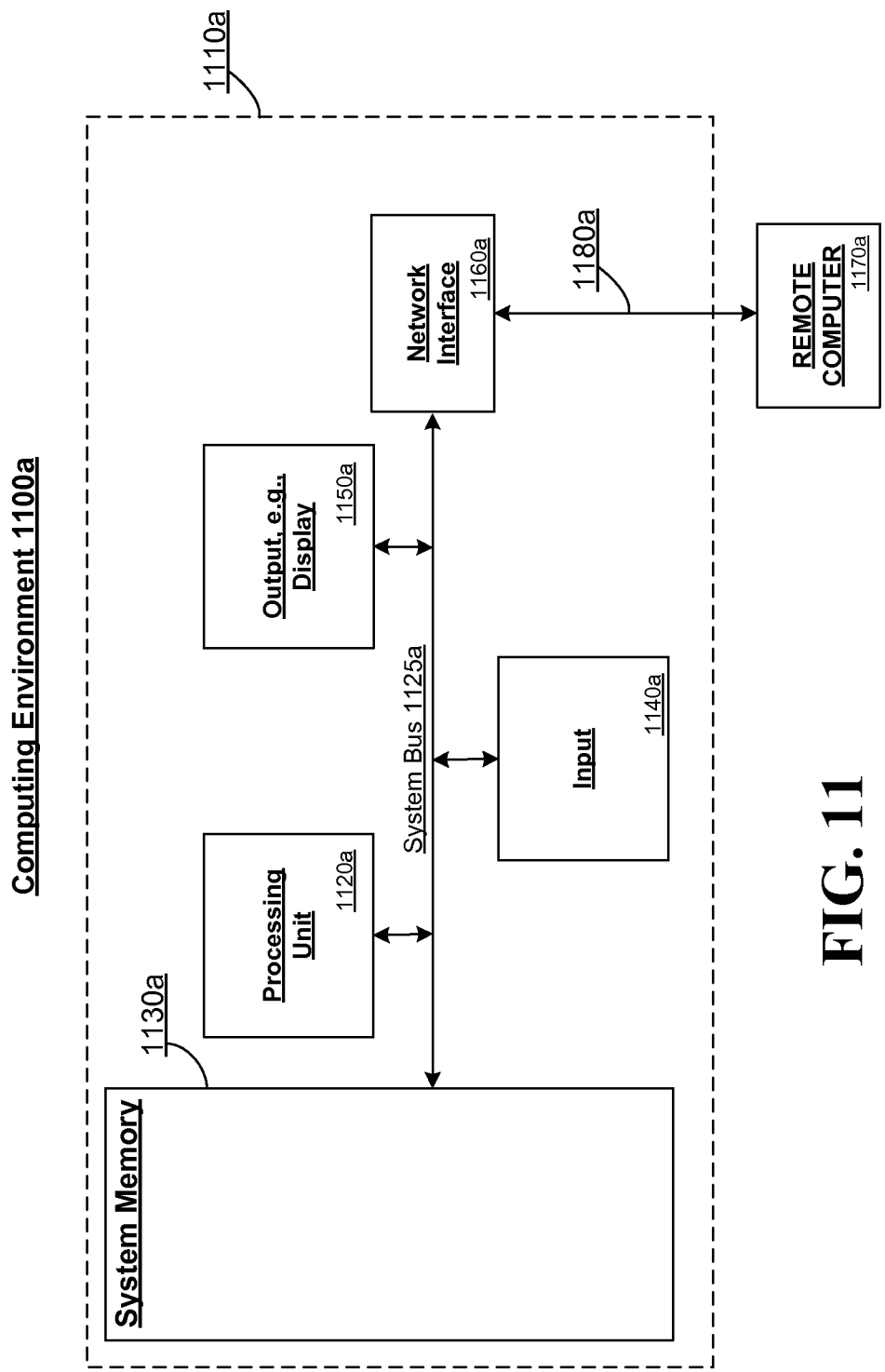
FIG. 11 illustrates an overview of a network environment suitable for service by one or more embodiments.

As mentioned, the innovation applies to any device wherein it may be desirable to communicate data, e.g., to a mobile device. It should be understood, therefore, that handheld, portable and other computing devices and computing objects of all kinds are contemplated for use in connection with the present innovation, i.e., anywhere that a device may communicate data or otherwise receive, process or store data. Accordingly, the below general purpose remote computer described below in FIG. 11 is but one example, and the present innovation may be implemented with any client having network/bus interoperability and interaction. Thus, the present innovation may be implemented in an environment of networked hosted services in which very little or minimal client resources are implicated, e.g., a networked environment in which the client device serves merely as an interface to the network/bus, such as an object placed in an appliance.

Although not required, at least one generalized non-limiting embodiment can partly be implemented via an operating system, for use by a developer of services for a device or object, and/or included within application software that operates in connection with the component(s) of at least one generalized non-limiting embodiment. Software may be described in the general context of computer executable instructions, such as program modules, being executed by one or more computers, such as client workstations, servers or other devices. Those skilled in the art will appreciate that the innovation may be practiced with other computer system configurations and protocols.

FIG. 11 thus illustrates an example of a suitable computing system environment 1100*a* in which the innovation may be implemented, although as made clear above, the computing system environment 1100*a* is only one example of a suitable computing environment for a media device and is not intended to suggest any limitation as to the scope of use or functionality of the innovation. Neither should the computing environment 1100*a* be interpreted as having any dependency or requirement relating to any one or combination of components illustrated in the exemplary operating environment 1100*a*.

With reference to FIG. 11, an exemplary remote device for implementing at least one generalized non-limiting embodiment includes a general purpose computing device in the form of a computer 1110*a*. Components of computer 1110*a* may include, but are not limited to, a processing unit 1120*a*, a system memory 1130*a*, and a system bus 1125*a* that couples various system components including the system memory to the processing unit 1120*a*. The system bus 1125*a* may be any of several types of bus structures including a memory bus or memory controller, a peripheral bus, and a local bus using any of a variety of bus architectures.

Computer 1110*a* typically includes a variety of computer readable media. Computer readable media can be any available media that can be accessed by computer 1110*a*. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110*a*. Communication media typically embodies computer readable instructions, data structures, program modules or other data in a modulated data signal such as a carrier wave or other transport mechanism and includes any information delivery media.

The system memory 1130*a* may include computer storage media in the form of volatile and/or nonvolatile memory such as read only memory (ROM) and/or random access memory (RAM). A basic input/output system (BIOS), containing the basic routines that help to transfer information between elements within computer 1110*a*, such as during start-up, may be stored in memory 1130*a*. Memory 1130*a* typically also contains data and/or program modules that are immediately accessible to and/or presently being operated on by processing unit 1120*a*. By way of example, and not limitation, memory 1130*a* may also include an operating system, application programs, other program modules, and program data.

The computer 1110*a* may also include other removable/non-removable, volatile/nonvolatile computer storage media. For example, computer 1110*a* could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1125*a* through a non-removable memory interface such as an interface, and a magnetic disk drive or optical disk drive is typically connected to the system bus 1125*a* by a removable memory interface, such as an interface.

A user may enter commands and information into the computer 1110*a* through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1120*a* through user input 1140*a* and associated interface(s) that are coupled to the system bus 1125*a*, but may be connected by other interface and bus structures, such as a parallel port, game port or a universal serial bus (USB). A graphics subsystem may also be connected to the system bus 1125*a*. A monitor or other type of display device is also connected to the system bus 1125*a* via an interface, such as output interface 1150*a*, which may in turn communicate with video memory. In addition to a monitor, computers may also include other peripheral output devices such as speakers and a printer, which may be connected through output interface 1150*a*.

The computer 1110*a* may operate in a networked or distributed environment using logical connections to one or more other remote computers, such as remote computer 1170*a*, which may in turn have media capabilities different from device 1110*a*. The remote computer 1170*a* may be a personal computer, a server, a router, a network PC, a peer device or other common network node, or any other remote media consumption or transmission device, and may include any or all of the elements described above relative to the computer 1110*a*. The logical connections depicted in FIG. 11 include a network 1180*a*, such local area network (LAN) or a wide area network (WAN), but may also include other networks/buses. Such networking environments are commonplace in homes, offices, enterprise-wide computer networks, intranets and the Internet.

When used in a LAN networking environment, the computer 1110*a* is connected to the LAN 1180*a* through a network interface or adapter. When used in a WAN networking environment, the computer 1110*a* typically includes a communications component, such as a modem, or other means for establishing communications over the WAN, such as the Internet. A communications component, such as a modem, which may be internal or external, may be connected to the system bus 1125*a* via the user input interface of input 1140*a*, or other appropriate mechanism. In a networked environment, program modules depicted relative to the computer 1110*a*, or portions thereof, may be stored in a remote memory storage device. It will be appreciated that the network connections shown and described are exemplary and other means of establishing a communications link between the computers may be used.

While the present innovation has been described in connection with the preferred embodiments of the various Figures, it is to be understood that other similar embodiments may be used or modifications and additions may be made to the described embodiment for performing the same function of the present innovation without deviating therefrom. For example, one skilled in the art will recognize that the present innovation as described in the present application may apply to any environment, whether wired or wireless, and may be applied to any number of such devices connected via a communications network and interacting across the network. Therefore, the present innovation should not be limited to any single embodiment, but rather should be construed in breadth and scope in accordance with the appended claims.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Various implementations of the innovation described herein may have aspects that are wholly in hardware, partly in hardware and partly in software, as well as in software. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present innovation, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the innovation. In the case of program code execution on programmable computers, the computing device generally includes a processor, a storage medium readable by the processor (including volatile and non-volatile memory and/or storage elements), at least one input device, and at least one output device.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The terms "article of manufacture", "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components, e.g., according to a hierarchical arrangement. Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the various flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

A content-adaptive temporal search range control algorithm is herein described. One embodiment of an algorithm is based on the observation that the search range should be set to the minimum value such that the degradation in Rate Distortion performance is negligible. Simulation results show that effective reduction of complexity and adaptability to the content characteristics can be achieved with negligible Rate Distortion performance degradation. Furthermore, substantial gain can be obtained by combining the herein described algorithm with other block based fast MRFME algorithms.

While the present innovation has been described in connection with the preferred embodiments of the various figures, it is to be understood that other similar embodiments may be used or modifications and additions may be made to the described embodiment for performing the same function of the present innovation without deviating therefrom.

While exemplary embodiments refer to utilizing the present innovation in the context of particular programming language constructs, specifications or standards, the innovation is not so limited, but rather may be implemented in any language to perform the optimization algorithms and processes. Still further, the present innovation may be implemented in or across a plurality of processing chips or devices, and storage may similarly be effected across a plurality of devices. Therefore, the present innovation should not be limited to any single embodiment, but rather should be construed in breadth and scope in accordance with the appended claims.

What is claimed is:

1. A method, comprising:
receiving, by a system comprising a processing device, a sequence of image frames including at least one reference frame of the sequence of image frames; and
encoding the sequence of image frames including adaptively changing a search range for searching the at least one reference frame based at least upon a reference frame buffer utilization index associated with a reference frame buffer configured for storage of a plurality of image frames, wherein the reference frame buffer utilization index is determined by dividing a total number of pixels that are stored in the reference frame buffer and are referenced by at least one predicted image frame of the sequence of image frames that has been predicted by the encoding at a time the adaptively changing the search range is initiated by a multiplication of a value for the search range, with a number of pixels in an image frame currently being predicted of the sequence of image frames, wherein the total number of pixels and the number of pixels are represented in terms of a unit of measurement.

2. The method of claim 1, wherein the unit of measurement is representative of a macroblock comprising a fixed number of pixels.

3. The method of claim 1, wherein the adaptively changing the search range further comprises determining whether usage of the search range results in a measure of distortion of an encoded image frame of the sequence of image frames being determined to be less than a first threshold value or the measure of distortion of the encoded image frame being determined to be greater than a second threshold value.

4. The method of claim 3, wherein the adaptively changing the search range further comprises, in response to determining that the usage of the search range results in the measure of distortion of the encoded image frame being greater than the second threshold value, increasing the search range.

5. The method of claim 3, wherein the adaptively changing the search range further comprises, in response to determining that the usage of the search range results in the measure of distortion of the encoded image frame being less than the first threshold value, decreasing the search range.

6. The method of claim 3, wherein the adaptively changing the search range further comprises, in response to determining that the usage of the search range neither results in the measure of distortion of an encoded image frame being less than the first threshold value nor the measure of distortion of the encoded image frame being greater than the second threshold value, maintaining the search range.

7. The method of claim 1, wherein the unit of measurement is a pixel.

8. The method of claim 1, wherein the adaptively changing is performed at a predefined interval of frames of the sequence of image frames, and the predefined interval is greater than 1 frame.

9. The method of claim 1, wherein the adaptively changing the search range further comprises adaptively changing the search range at least partially based on detecting a scene change.

10. The method of claim 9, wherein the detecting the scene change comprises determining whether an accumulated residue energy for a current frame of the sequence of image frames meets a condition.

11. A system, comprising:
a memory, communicatively coupled to a processor, the memory having stored therein executable components, comprising:
at least one data store configured to store a sequence of frames of video data; and
an optimizer component configured to encode the sequence of frames using a process that adaptively changes a search range for searching at least one reference frame associated with the sequence of frames based at least upon a reference frame buffer utilization index associated with a reference frame buffer configured for storage of a plurality of frames, wherein the reference frame buffer utilization index is determined by dividing a total number of pixels that are stored in the reference frame buffer and are referenced by at least one predicted frame of the sequence of frames that has been predicted by the encoding at a time the adaptively changing the search range is initiated by a multiplication of a value for the search range, with a number of pixels in an frame currently being predicted of the sequence of frames, wherein the total number of pixels and the number of pixels are represented in terms of a unit of measurement.

12. The system of claim 11, wherein the unit of measurement is representative of a macroblock comprising a fixed number of pixels.

13. The system of claim 11, wherein the optimizer component is further configured to determine whether usage of the search range results in a measure of distortion of an encoded frame of the sequence of frames becoming less than a first threshold value or the measure of distortion of the encoded frame becoming greater than a second threshold value.

14. The system of claim 13, wherein the optimizer component is further configured to increase the search range in response to a determination that the usage of the search range has resulted in the measure of distortion of the encoded frame being greater than a second threshold value.

15. The system of claim 13, wherein the optimizer component is further configured to decrease the search range in response to a determination that the usage of the search range has resulted in the measure of distortion of the encoded frame being less than the first threshold value.

16. The system of claim 13, wherein the optimizer component is further configured to maintain the search range in response to a determination that the usage of the search range has neither resulted in the measure of distortion of the encoded frame being less than the first threshold value nor resulted in the measure of distortion of the encoded frame being greater than the second threshold value.

17. The system of claim 11, wherein the optimizer component is further configured to adaptively vary the search range at a predefined interval of frames of the plurality of frames, wherein the predefined interval is greater than 1 frame.

18. The system of claim 11, wherein the search range has a maximum range and a minimum range within which the search range adaptively changes.

19. The system of claim 11, wherein the optimizer component is further configured to:
   detect a scene change based on a determination of whether an accumulated residue energy for a current frame of the sequence of frames satisfies a condition; and
   adaptively vary the search range in response to detection of the scene change.

20. A method, comprising:
   receiving a series of image frames including reference frames and non-reference frames;
   storing the reference frames in a reference frame buffer configured for storage of a plurality of frames;
   encoding the series of image frames including varying a search range during the encoding based upon a reference frame buffer utilization index associated with the reference frame buffer; and
   determining the reference frame buffer utilization index at least in part by dividing a total number of pixels that are stored in the reference frame buffer and are referenced by at least one predicted image frame of the series of frames that has been predicted by the encoding at a time the adaptively changing the search range is initiated by a multiplication of a value for the search range, with a number of pixels in an image frame currently being predicted of the series of image frames, wherein the total number of pixels and the number of pixels are represented in terms of a unit of measurement.

21. The method of claim 20, further comprising re-determining the reference frame buffer utilization index in response to at least one criterion being determined to have been satisfied.

22. The method of claim 20, wherein the varying further comprises:
   determining whether usage of the search range results in a measure of distortion of an encoded image frame of the series of image frames being less than a first threshold or the measure of distortion of the encoded image frame being greater than a second threshold;
   in response to determining that the search range results in the measure of distortion of the encoded image frame being greater than the second threshold, increasing the search range;
   in response to determining that the search range results in the measure of distortion of the encoded image frame being less than the first threshold, decreasing the search range; and
   in response to determining that the search range neither results in the measure of distortion of the encoded image frame being greater than the second threshold nor measure of distortion of the encoded image frame being less than the first threshold, maintaining the search range.

23. The method of claim 21, wherein the re-determining is performed every Nth frame, where N is an integer.

24. The method of claim 20, further comprising:
   determining whether a scene change has occurred in the series of image frames based upon determining whether an accumulated residue energy for a current frame of the series of image frames has been determined to satisfy a condition; and
   in response to determining that the scene change has occurred, re-determining the reference frame buffer utilization index.

25. A non-transitory computer-readable storage medium having instructions stored thereon that, in response to execution, cause at least one device to perform operations comprising, comprising:
   receiving a sequence of image frames including at least one reference frame of the sequence of image frames; and
   encoding the sequence of image frames including adaptively changing a search range for searching the at least one reference frame based at least upon a reference frame buffer utilization index associated with a reference frame buffer configured for storage of a plurality of image frames,
   wherein the reference frame buffer utilization index is determined by division of a total number of pixels that are stored in the reference frame buffer and are referenced by at least one predicted frame of the sequence of image frames that has been predicted by the encoding at a time the adaptively changing the search range is initiated by a multiplication of a value for the search range, with a number of pixels in an image frame currently being predicted of the sequence of image frames, wherein the total number of pixels and the number of pixels are represented in terms of a unit of measurement.

26. The non-transitory computer-readable storage medium of claim 25, wherein the adaptively changing the search range for searching the at least one reference frame further comprises:
   determining whether usage of the search range results in a measure of distortion of an encoded image frame of the sequence of image frames being less than a first threshold or the measure of distortion of the encoded image frame being greater than a second threshold;
   in response to determining that the usage of the search range results in the measure of distortion of the encoded image frame being greater than the second threshold, increasing the search range;

in response to determining that the usage of the search range results in the measure of distortion of the encoded image frame being less than the first threshold, decreasing the search range; and in response to determining that the usage of the search range neither results in the measure of distortion of an encoded image frame being less than the first threshold nor the measure of distortion of the encoded image frame being greater than the second threshold, maintaining the search range.

27. A system, comprising:

means for receiving a sequence of image frames including at least one reference frame of the sequence of image frames; and means for encoding the sequence of image frames including adaptively changing a search range for searching the at least one reference frame based at least upon a reference frame buffer utilization index associated with a reference frame buffer configured for storage of a plurality of image frames, wherein the means for encoding comprises means for calculating the measure of utilization as a function of a total number of pixels that are stored in the reference frame buffer and are referenced by at least one predicted frame of the sequence of image frames that has been predicted by the encoding at a time the adaptively changing the search range is initiated by a multiplication of a value for the search range, with a number of pixels in an image frame currently being predicted of the sequence of image frames, wherein the total number of pixels and the number of pixels are represented in terms of a unit of measurement.

28. The system of claim 27, wherein means for adaptively changing the search range for searching the at least one reference frame further comprises:

means for determining whether usage of the search range results in a measure of distortion of an encoded image frame of the sequence of image frames being less than a first threshold or the measure of distortion of the encoded image frame being greater than a second threshold;

means for, in response to determining that the usage of the search range results in the measure of distortion of the encoded image frame being greater than the second threshold, increasing the search range;

means for, in response to determining that the usage of the search range results in the measure of distortion of the encoded image frame being less than the first threshold, decreasing the search range; and means for, in response to determining that the usage of the search range does not result in the measure of distortion of an encoded image frame being less than the first threshold and does not result in the measure of distortion of the encoded image frame being greater than the second threshold, maintaining the search range.

* * * * *